(12) United States Patent
Stephan et al.

(10) Patent No.: US 8,087,434 B2
(45) Date of Patent: Jan. 3, 2012

(54) FILLER NECK FOR THE FUEL TANK OF A VEHICLE

(75) Inventors: Markus Stephan, Gnotzheim (DE); André Brandis, Neuenhagen (DE); Katrin Buchholz, Weissenburg (DE)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 993 days.

(21) Appl. No.: 11/828,462

(22) Filed: Jul. 26, 2007

(65) Prior Publication Data

US 2008/0067797 A1    Mar. 20, 2008

(30) Foreign Application Priority Data

Jul. 31, 2006    (DE) .......................... 10 2006 035 926
Nov. 29, 2006    (DE) .......................... 10 2006 056 553

(51) Int. Cl.
*B65B 1/04*    (2006.01)

(52) U.S. Cl. .......................... 141/350; 141/301; 220/86.2
(58) Field of Classification Search .................. 141/350, 141/301, 348, 349; 220/86.2
See application file for complete search history.

(56) References Cited

U.S. PATENT DOCUMENTS

| | | | |
|---|---|---|---|
| 5,056,570 A | 10/1991 | Harris et al. | |
| 5,465,861 A | 11/1995 | Kunz et al. | |
| 7,096,899 B2 * | 8/2006 | Vetter et al. | 141/350 |
| 7,721,775 B2 * | 5/2010 | Pozgainer | 141/350 |
| 2002/0189691 A1 | 12/2002 | Morinaga | |

FOREIGN PATENT DOCUMENTS

EP    0602433    11/1993
WO    WO 2006066294    6/2006

OTHER PUBLICATIONS

English Abstract of EP 0602433 published Nov. 27, 1993.
French Search Report—4 pages.

* cited by examiner

*Primary Examiner* — Gregory Huson
*Assistant Examiner* — Jason Niesz
(74) *Attorney, Agent, or Firm* — Dority & Manning, P.A.

(57) ABSTRACT

The invention refers to a filler neck for the fuel tank of a vehicle that encompasses a refueling channel (2), a first opening (3) and below it, arranged in a transversal wall (11), a second opening (7) that can be closed by a closing device. In a longitudinal section (27) of the refueling tank (2) that extends between the transversal wall (11) and the first opening (3), ends a drainage channel (10) via a drainage opening (12). In addition, a closing element (15) has been arranged in the longitudinal section (27), movable between a position that closes the drainage opening (12) and one position that releases it.

9 Claims, 3 Drawing Sheets

FILLER NECK FOR THE FUEL TANK OF A VEHICLE

FIELD OF THE INVENTION

The invention refers to a filler neck for the gasoline tank of a vehicle.

BACKGROUND

A filler neck may be arranged in the upper end of a mostly one-piece tube connected to the gas tank. It encloses a refueling tank with a circumferential wall and has a first opening in its upper end, and below it a second opening placed in a transversal wall, so it can be closed with a closing device located below the arranged closing valve, for example. The terms "upper" and "lower" refer to the state of assembly of the filler neck. The closing device, for example, has a spring impinged on it in closing direction and is opened by inserting a gas tank nozzle. At least a terminal section of the filler cap extends into a tank cavity of the car body that can be closed by a tank cap.

Especially in self-closing systems (so-called capless systems), there is the danger that during cleaning of the tank cavity, water or cleaning solution may get into the filler neck and from there into the tank through the second opening when the closing device is opened during refueling, for example.

In capless systems, the closing device does not close the filler neck (or its first opening); rather, its function is taken over by the closing device that acts together with the second opening. In the inner side of the tank cap there is a first opening with an elastomer seal to prevent dirt from entering. When the tank cavity needs to be cleaned, the tank cap is opened and the elastomer seal removed from the filler neck, in which case water can easily get into the filler neck, either intentionally or accidentally.

In the case of filler necks closed with a tank cap, water can most likely penetrate into the filler necks if high-pressure cleaners are used. WO 2006/066294 A1 discloses a filler neck in which an insert has been placed between the transversal wall and the first opening, extending into the longitudinal section of the filler neck that circumscribes an insertion channel for the insertion of a gas tank nozzle. In a space between the insert and the circumferential wall of the filler neck, a drainage channel ends in a drainage opening. Water that has penetrated the system can flow out into the surroundings via this opening. To regulate the drainage opening, a closing element is present which can be moved between a closing position to close the drainage opening and a release position for releasing purposes. In addition, there is an actuator working together with the closing element that in the closing element's release position projects so much into the insertion channel that the gas tank nozzle inserted therein impinges on it, thereby moving the closing element to its closing position. As a result of this, no gasoline can flow out into the surroundings via the drainage channel while refueling.

Although the known filler neck prevents water from getting into the fuel tank or fuel from flowing out into the surroundings, this is unfortunately associated with relatively expensive manufacturing and long assembly time. Furthermore, the insert mentioned above is made of several individual parts that increase manufacturing expense and assembly time. In addition, the closing element has been arranged in an intermediate space located between the insert and the circumferential wall, in which case it is placed so it can swivel around an axis. The actuator is a metallic clip that is expensive to make and that must be attached to the insert, something requiring a lot of manipulation.

Therefore, present disclosure suggests a filler neck of the type described above that can be easily manufactured and mounted.

SUMMARY

A filler neck may be made in such a way that the insert, the closing element, and the actuator comprise one single part. The disclosure is based on the consideration to use the insert as carrier both for the closing element and the actuator. The insert (made generally of plastic) can be easily manufactured as an injection-molded part. Mounting would require only one step, namely positioning the insert in the filler neck. The one-piece shape would also prevent any moveable connections to become loose among the parts, something that could lead to functional problems.

In a preferred embodiment, the closing element has an elastic, workable shape, allowing the drainage opening to open in its non-deformed state, whereas it would close the opening in its deformed state. After being impinged on by the actuator when refueling, it subsequently returns to the opening position by itself owing to elastic restoring forces. The elastic deformation capacity makes it possible not to use any hinge joints, which are expensive to manufacture and difficult to mount. In the case of a plastic insert, the deformability is possible either due to the corresponding plastic material and/or due to the suitable shape given to the closing element.

Preferably, the insert has a wall with a shape largely resembling a tube section, from which the closing element has been cut free. Here, the closing element forms part of a wall section and can have a striped shape, for example. Preferably, it should extend into the insert's longitudinal direction, in which case its free end would be oriented towards the tank's interior and form a combined surface with the drainage opening in the external side located opposite the insertion channel.

In this case, the upper end of the closing element is connected as one single piece to the insert or its wall, in which case the connecting point acts like a hinge to allow a horizontal sweep towards axial direction, for example. Due to the fact that the sealing surface has been arranged towards the tank's interior or to the free end of the closing element (which points down), the drainage opening can thus have a very low arrangement (in other words, placed in a geodetically low point of the filler neck where the water that got in has accumulated). An additional preferred design foresees the plane defined by the surface and the plane defined by the drainage opening to encompass an acute angle pointing towards the insertion direction or the bottom. If the angle is chosen the right way, this would ensure the planes mentioned above run parallel to each other in the closing element's closing position and the closing element to hermetically seal the drainage opening.

In another preferred design variant, the closing element is operated in such a way that the first section of the actuator projects so much into the refueling channel that a gas tank nozzle inserted therein impinges upon it and as a result of this, it is moved roughly radially towards the exterior. In this case, it moves the closing element to its closing position. In order to facilitate the roughly radial movement of the actuator by the gas tank nozzle inserted longitudinally into the filler neck, the first section has an oblique surface creating an angle that—together with the medium longitudinal axis of the refueling tank—opens up towards the first opening. Another preferred design foresees the actuator to have a second section that on the one hand is molded onto the upper end of the first section and on the other hand is molded onto the free end of the closing element. Thus, the upper end of the first section is located above the free end of the closing element, thereby associated with structural space savings in the longitudinal direction of the filler neck.

In order to facilitate the insertion of a gas tank nozzle, a filler neck is equipped with a feeding funnel most of the time. In another preferred design, the funnel is not a separate part requiring expensive manufacturing and time-consuming assembly, but an integral (especially one-piece), component of the insert, in which case the latter has been made with several ribs projecting radially towards the interior.

To facilitate drainage of the water that has penetrated the filler neck, the transversal wall of the second opening has been pre-arched upwards, as a result of which a gutter-shaped recess is created between it and the circumferential wall of the filler neck.

BRIEF DESCRIPTION OF THE DRAWINGS

The invention is explained in more detail with the help of the enclosed illustrations, which show.

DETAILED DESCRIPTION

Figure 1:
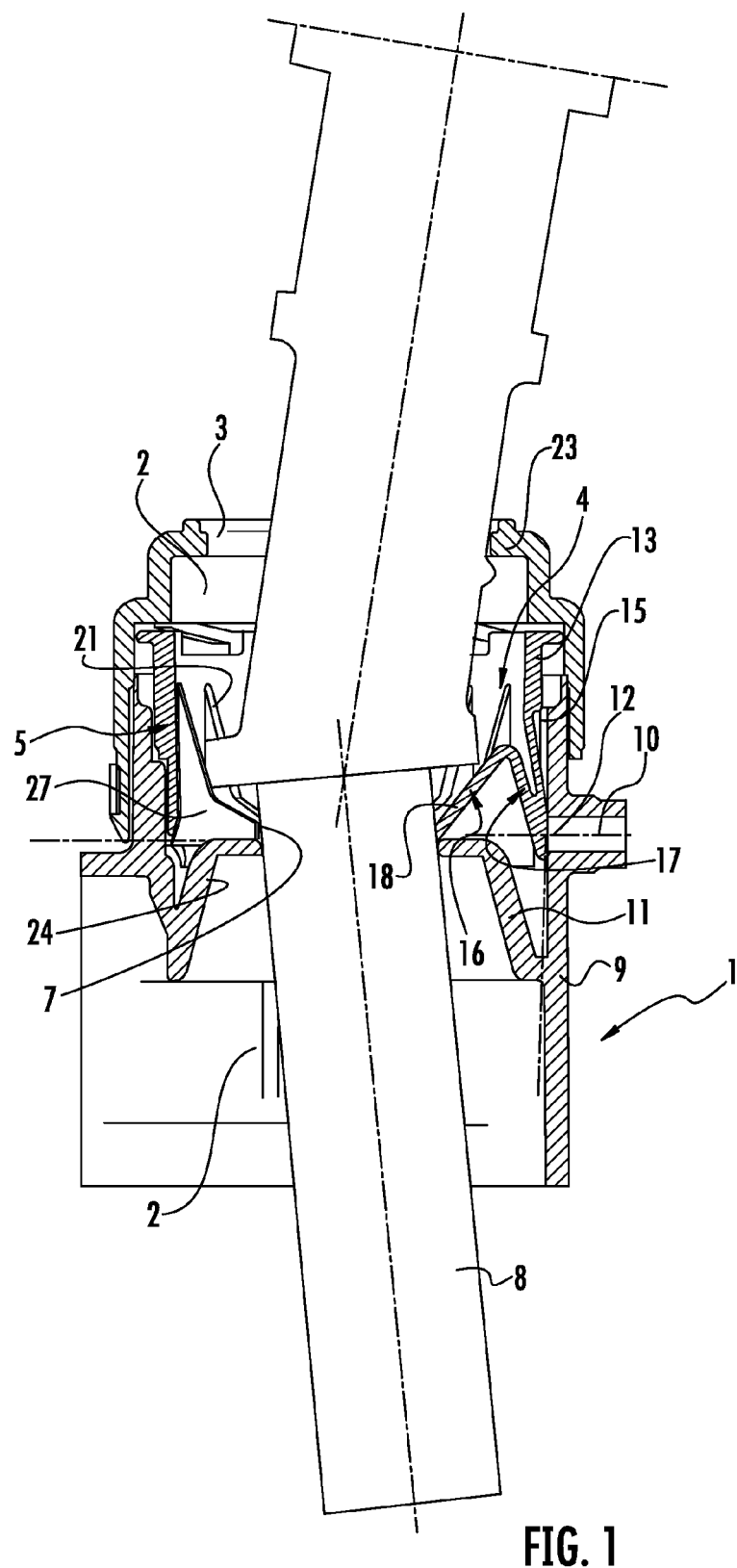
FIG. 1, a longitudinal section through the upper region of a filler neck with the gas tank nozzle inserted therein, FIG. 2, a diagram corresponding to FIG. 1, but enlarged and without gas tank nozzle, FIG. 3, two perspective illustrations of an insert located within the filler neck from two different viewpoints.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

Figure 2:
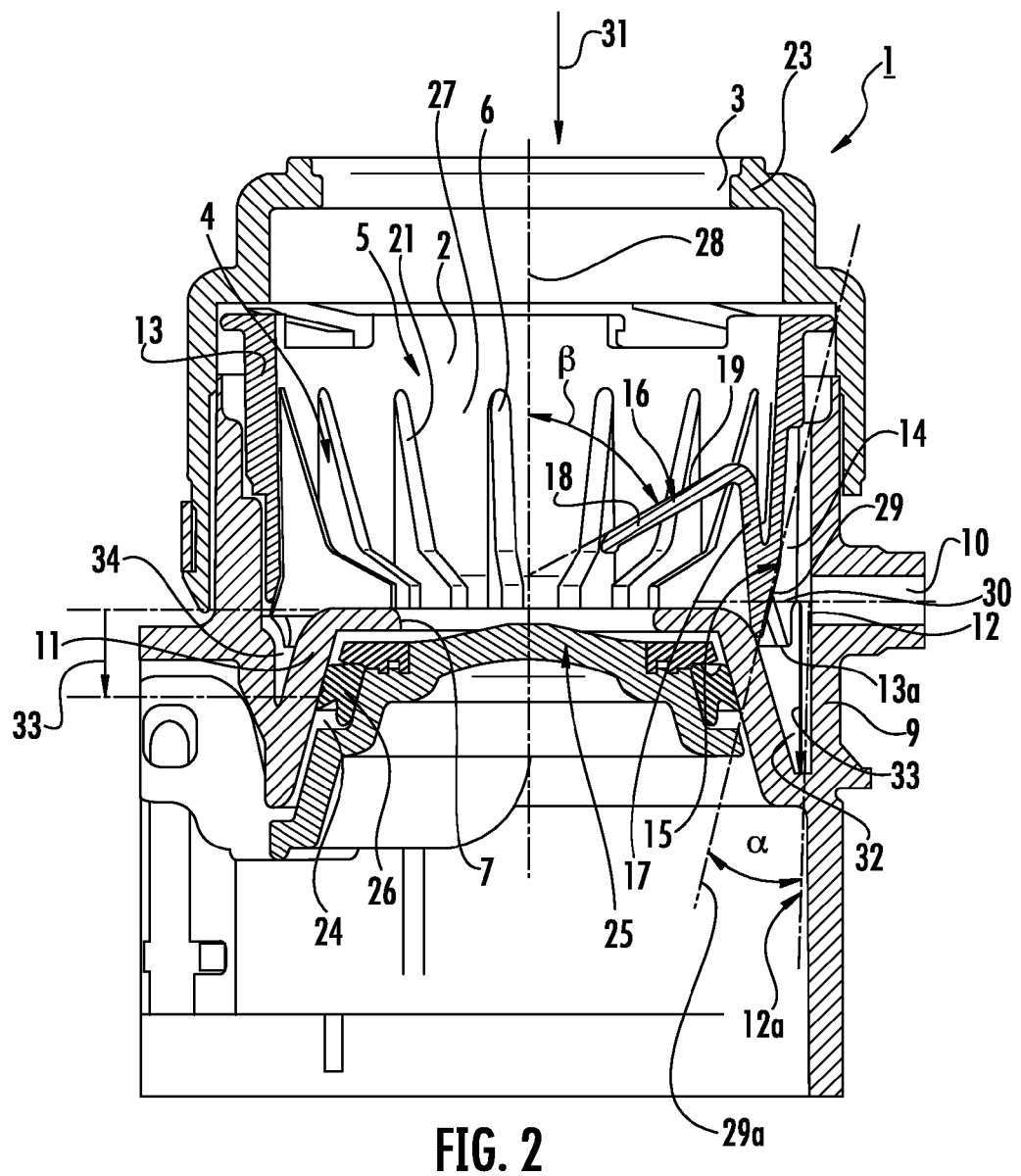
Figure 3A:
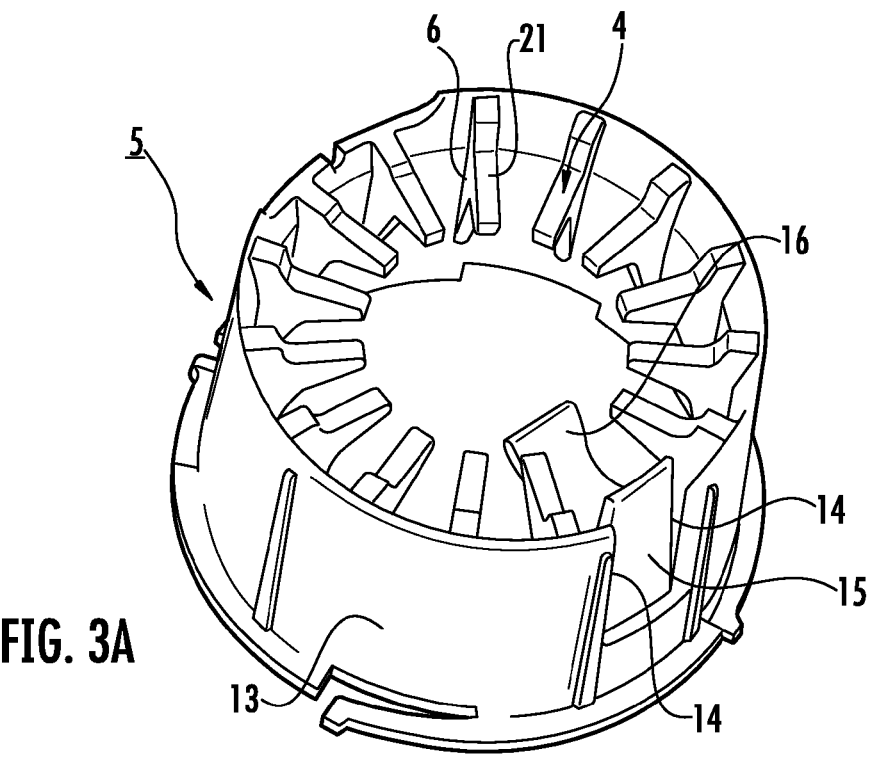
Figure 3B:
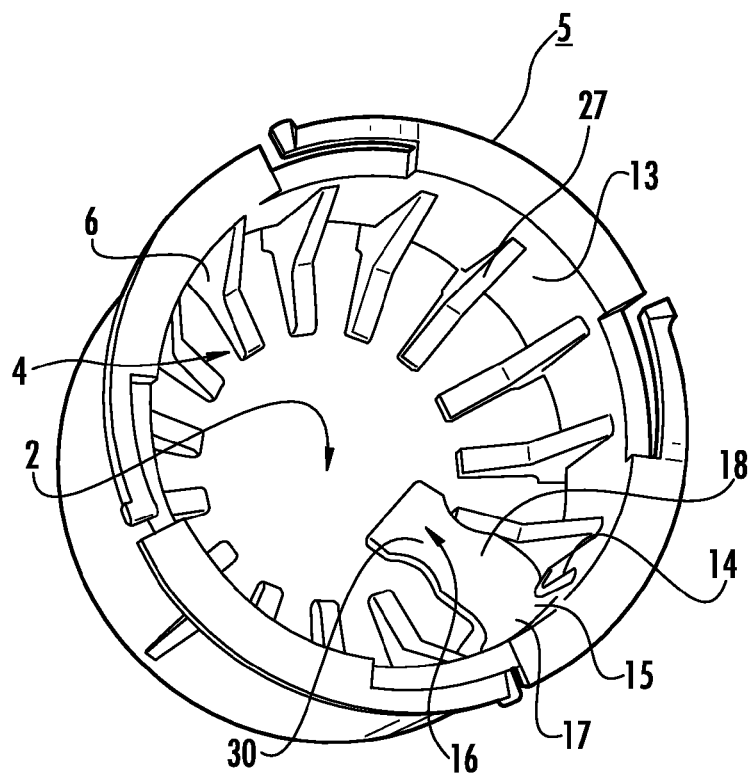

FIGS. 1 and 2 show the upper part of a filler neck 1. The filler neck 1 with a circumferential wall 1a has a first opening 3 delimited by a border 23 projecting radially towards the interior so a tank gas nozzle 8 can be hanged. Below the opening 3, a transversal wall 11 arching upwards like a cone has been arranged and is interspersed by an insertion opening or a second opening 7. A closing valve 25 (not shown in FIG. 1) located below the second opening 7 serves as closing device, closely fitting to the cone-like area 24 of the transversal wall 11 with a sealing ring 26. The closing valve 25 can be opened with a gas tank nozzle 8 inserted into the refueling channel 2.

Above the transversal wall 11, an insert 5 has been arranged to support a feeding funnel 4 and a sectional tube-like wall 13 and to circumscribe an insertion channel 2 that serves for inserting a gas tank nozzle. The feeding funnel 4 is formed by numerous ribs 6 distributed in longitudinal direction and jutting out radially from the wall 13 towards the interior, the ribs' upper sides form insertion bevels 21 in each case that act together with the gas tank nozzle 8. In the longitudinal section 27 of the refueling tank 2 (in which the insert 5 has also been arranged) extending between the transversal wall 11 and the first opening 3, a drainage channel 10 ends in a drainage opening 12. As far as assembly is concerned, the drainage channel has been arranged in a geodesically low point—in other words, in a place where the water that penetrated the longitudinal section 27 has accumulated. Owing to the pre-arching of the transversal wall 11 mentioned above, and located between the wall and the circumferential wall 1a of the filler neck 1, a gutter-like recess 23 has been created so the water that got inside can accumulate. The depth 33 of the recess 32 is not uniform, but continuously increases from a point 34 diametrically opposed to the drainage opening 12 to reach its highest value near the drainage opening 12. The water that has already penetrated the filler neck 1 can flow through this embodiment to the drainage opening 12. This effect is additionally increased by the fact that, as a rule, the filler neck is assembled obliquely into the vehicle (in FIGS. 1 and 2, tilted towards the right).

A closing element 15 closes the drainage opening 12 during refueling (FIG. 1). The closing element 15 is formed by two free sections 14 in the wall 13 of the insertion 5 that run roughly parallel to each other and towards the medium longitudinal axis 28 of the insert 5. The free sections 14 end in the lower outer side 13a of the wall 13. Therefore, the free end of the closing element 25 points towards the tank's interior. On its outer side that looks away from the medium longitudinal axis 28, it has a sealing surface 29 that acts together with the drainage opening 12. In order to facilitate the elastic deformability or deflection of the closing element, it has a reduced thickness with respect to the wall 13 of the insert 5. In addition, the closing element 15 and the insert 5 have been arranged in such a way that there is a gap 30 between the closing element in its release position and the drainage opening.

An actuator 16 has been placed so it is oriented toward the side of the free end of the closing element 15, and is connected with the closing element 15 as one piece and with a first section 18 projecting so far into the refueling channel 2 that a gas tank nozzle 8 inserted therein impinges on it and in doing so, is moved roughly radially towards the exterior. The first section 18 has an oblique surface 19 that acts together with the gas tank nozzle 8, and this surface forms an angle α that opens up towards the first opening 3 with the medium longitudinal axis 28 of the insert 5. At the upper end of section 18, a second section 17 running obliquely towards the bottom has been placed, which in turn is connected to the free end of the closing element 15. Thus, when seen in longitudinal section or from the side (FIG. 2), the first and second sections (18 and 17, respectively) create a V-shaped structure that opens up towards the tank's interior or the second opening 7.

If a gas tank nozzle 8 is inserted into the filler neck 1, then the former will run into the oblique surface 19 running obliquely towards the bottom of the actuator 16, thereby pressing the elastically deformed closing element 15 and its sealing surface 29 against the drainage opening 12. The sealing surface 29 has been beveled in such a way compared to the remaining outer surface of the closing element 15 that in the release position, the plane 29a defined by the sealing surface and the plane 12a defined by the drainage opening enclose an angle α opening up towards the bottom or towards the insertion direction 31 (FIG. 2). Owing to this embodiment, after the sealing surface 29 has been swung, it will fit closely and uniformly in the closing position, on the opening border of the drainage opening 12. To increase the sealing effectiveness of the closing element 15, one can install a sealing element (not shown) in the sealing surface 29 that could be made of an elastomeric material, for example. In closed position, the closing element 15 prevents the fuel that has entered the system via the opening 3 located in the longitudinal section 27 of the refueling tank (as can happen in case of excessive refueling) from escaping unnoticed into the surroundings via the drainage channel 10.

While preferred embodiments have been shown and described, those skilled in the art will recognize that changes and modifications may be made to the foregoing examples without departing from the scope and spirit of the invention.

For example, specific styles and dimensions of various elements of the illustrated embodiments and materials used for those elements may be altered to suit particular applications and industry regulations. It is thus intended to claim all such changes and modifications as fall within the scope of the appended claims and their equivalents.

The invention claimed is:

1. Filler neck for a fuel tank of a vehicle the filler neck comprising:
    a circumferential wall atop a transversal wall of the fuel tank, the circumferential wall defining a first opening and a second opening below the first opening;
    a closing device for closing the first second opening;
    an insert circumscribing a longitudinal insertion channel within the circumferential wall for receiving a gas nozzle into the transversal wall of the fuel tank via the first opening;
    a drainage channel running into a drainage opening, in communication with a space located between the insert and the circumferential wall;
    a movable closing element movable between a closed position closing the drainage opening and a released position releasing the drainage opening;
    an actuator movable with the closing element, the actuator when the closing element is in the released position projecting into the insertion channel sufficiently that a gas nozzle inserted therein impinges on the actuator and as a result the closing element is moved to the closed position, wherein the insert, the closing element and the actuator form one unitary piece, the insert having a substantially tube-shape a wall from which the closing element freely extends.

2. Filler neck according to claim 1, wherein the closing element can be elastically deformed, in which case the closing element releases the drainage opening in a non-deformed state and closes the drainage opening in a deformed state.

3. Filler neck according to claim 1, wherein the closing element extends longitudinally into the insert, in which case a free end of the closing element points towards an interior of the fuel tank and an external side of the closing element that extends away from the insertion channel has a sealing surface that acts together with the drainage opening.

4. Filler neck according to claim 3, wherein the plane defined by the sealing surface and the plane defined by the drainage opening enclose an acute angle ($\alpha$) that opens up towards the insertion direction.

5. Filler neck according to claim 1, wherein a first section of the actuator juts into the refueling tank sufficiently that a gas nozzle inserted therein impinges on the actuator and moves the actuator roughly radially towards the exterior, in which case the first section has an oblique surface that acts together with the gas nozzle, and the oblique surface creates an angle ($\beta$) with the central longitudinal axis of the insert that opens up towards the first opening.

6. Filler neck according to claim 5, wherein the actuator has a second section that on the one end is attached to an upper end of the first section and on the other end is attached to a free end of the closing element.

7. Filler neck according to claim 1, wherein the insert encompasses a feeding funnel.

8. Filler neck according to claim 7, wherein the feeding funnel is formed by several ribs projecting radially inwards.

9. Filler neck according to claim 1, wherein the transversal wall has been pre-arched toward the top, thereby forming a gutter-shaped recess between the transversal wall and the circumferential wall of the filler neck.

* * * * *